(12) United States Patent
Henderson

(10) Patent No.: US 11,283,826 B2
(45) Date of Patent: Mar. 22, 2022

(54) DYNAMIC PREVIEW OF SECURITY VULNERABILITY LEVELS IN A MANAGED NETWORK

(71) Applicant: ServiceNow, Inc., Santa Clara, CA (US)

(72) Inventor: Lisa Sherilyn Henderson, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 449 days.

(21) Appl. No.: 16/450,601

(22) Filed: Jun. 24, 2019

(65) Prior Publication Data

US 2020/0382546 A1    Dec. 3, 2020

Related U.S. Application Data

(60) Provisional application No. 62/855,249, filed on May 31, 2019.

(51) Int. Cl.
*H04L 29/06* (2006.01)
*G06F 40/177* (2020.01)

(52) U.S. Cl.
CPC ........ *H04L 63/1433* (2013.01); *G06F 40/177* (2020.01)

(58) Field of Classification Search
CPC ............................ H04L 63/1433; G06F 40/177
See application file for complete search history.

(56) References Cited

U.S. PATENT DOCUMENTS

| 7,062,683 | B2 | 6/2006 | Warpenburg |
| 7,610,512 | B2 | 10/2009 | Gerber |
| 7,617,073 | B2 | 11/2009 | Trinon |
| 7,890,802 | B2 | 2/2011 | Gerber |
| 7,945,860 | B2 | 5/2011 | Vambenepe |
| 7,966,398 | B2 | 6/2011 | Wiles |
| 8,181,253 | B1 * | 5/2012 | Zaitsev ............... H04L 63/1433 726/25 |
| 8,224,683 | B2 | 7/2012 | Manos |

(Continued)

OTHER PUBLICATIONS

Servicenow, "Madrid Security Incident Management" last updated May 14, 2019.

*Primary Examiner* — Sarah Su
(74) *Attorney, Agent, or Firm* — Fletcher Yoder PC

(57) ABSTRACT

A system may include a server device configured to: receive selected factors and respective weights for each of the selected factors; obtain combinations of selected primary factors that total less than a maximum number of rows; determine a duplication count for the combinations of selected primary factors; and generate, for display on a graphical user interface, data representing a table, where each column of the table represents one of the selected factors, where for columns of the table representing selected primary factors, rows represent each of the combinations of selected primary factors duplicated according to the duplication count, where for columns of the table representing selected secondary factors from the selected factors, rows represent repeated iteration through possible values of the selected secondary factors, and where each row includes a respective risk score based on a weighted average of the respective weights applied to the selected factors represented therein.

20 Claims, 15 Drawing Sheets

(56) References Cited

U.S. PATENT DOCUMENTS

| | | | |
|---|---|---|---|
| 8,674,992 B2 | 3/2014 | Poston | |
| 9,172,720 B2 * | 10/2015 | Foley | G06F 21/56 |
| 9,762,603 B2 * | 9/2017 | Grondin | G06F 21/6245 |
| 9,911,087 B1 | 3/2018 | Henderson et al. | |
| 11,146,583 B2 * | 10/2021 | Nhlabatsi | H04L 63/1441 |
| 2016/0253608 A1 * | 9/2016 | DiMartino | G06Q 30/0202 |
| | | | 705/4 |
| 2017/0353482 A1 * | 12/2017 | Sommer | H04L 63/20 |
| 2020/0162498 A1 * | 5/2020 | Ababtain | H04L 43/062 |
| 2021/0064758 A1 * | 3/2021 | Zettel, II | G06F 21/577 |
| 2021/0144168 A1 * | 5/2021 | Vester | G06F 8/65 |
| 2021/0211450 A1 * | 7/2021 | Aleidan | H04L 63/1433 |

\* cited by examiner

Risk Score Scenarios 900

| Severity (80%) | Exploit Exists (20%) | Risk Score |
|---|---|---|
| Critical | Yes | 100 (Critical) |
| Critical | No | 80 (High) |
| High | Yes | 80 (High) |
| High | No | 60 (Medium) |
| Medium | Yes | 60 (Medium) |
| Medium | No | 40 (Medium) |
| Low | Yes | 40 (Medium) |
| Low | No | 20 (Medium) |
| None | No | 0 (None) |

FIG. 9A

Risk Score Scenarios

902

| Severity (70%) | Exploit Exists (10%) | CI Exposure (20%) | Risk Score |
|---|---|---|---|
| Critical | Yes | Internet-facing | 100 (Critical) |
| Critical | Yes | Internal | 90 (Critical) |
| Critical | No | Internet-facing | 90 (Critical) |
| Critical | No | Internal | 80 (High) |
| High | Yes | Internet-facing | 83 (High) |
| High | Yes | Internal | 73 (High) |
| High | No | Internet-facing | 73 (High) |
| High | No | Internal | 63 (Medium) |
| Medium | Yes | Internet-facing | 65 (Medium) |
| Medium | Yes | Internal | 55 (Medium) |
| Medium | No | Internet-facing | 55 (Medium) |
| Medium | No | Internal | 45 (Medium) |
| Low | Yes | Internet-facing | 48 (Medium) |
| Low | Yes | Internal | 38 (Low) |
| Low | No | Internet-facing | 38 (Low) |
| Low | No | Internal | 28 (Low) |
| None | No | None | 0 (None) |

Risk Score Scenarios

| Severity (80%) | CI Importance (10%) | CI Exposure (10%) | Risk Score |
|---|---|---|---|
| Critical | Important | Internet-facing | 100 (Critical) |
| Critical | High | Internal | 93 (Critical) |
| Critical | Medium | Internet-facing | 95 (Critical) |
| Critical | Low | Internal | 88 (High) |
| Critical | No Services | Internet-facing | 90 (Critical) |
| High | Important | Internal | 75 (High) |
| High | High | Internet-facing | 78 (High) |
| High | Medium | Internal | 70 (High) |
| High | Low | Internet-facing | 73 (High) |
| High | No Services | Internal | 65 (Medium) |
| Medium | Important | Internet-facing | 60 (Medium) |
| Medium | High | Internal | 53 (Medium) |
| Medium | Medium | Internet-facing | 55 (Medium) |
| Medium | Low | Internal | 48 (Medium) |
| Medium | No Services | Internet-facing | 50 (Medium) |
| Low | Important | Internal | 35 (Low) |
| Low | High | Internet-facing | 38 (Low) |
| Low | Medium | Internal | 30 (Low) |
| Low | Low | Internet-facing | 33 (Low) |
| Low | No Services | Internal | 25 (Low) |
| None | No Services | None | 0 (None) |

FIG. 9C

Risk Score Scenarios

| Severity (50%) | Exploit Exists (20%) | Exploit Skill Level (5%) | Exploit Attack Vector (5%) | CI Importance (20%) | Risk Score |
|---|---|---|---|---|---|
| Critical | Yes | Novice | Remote | Important | 100 (Critical) |
| Critical | Yes | Intermediate | Remote | High | 93 (Critical) |
| Critical | Yes | Expert | Local | Medium | 84 (High) |
| Critical | No | No exploits | No exploits | Low | 55 (Medium) |
| High | Yes | Novice | Remote | No Services | 68 (Medium) |
| High | Yes | Intermediate | Remote | Important | 86 (High) |
| High | Yes | Expert | Local | High | 77 (High) |
| High | No | No exploits | No exploits | Medium | 48 (Medium) |
| Medium | Yes | Novice | Remote | Low | 60 (Medium) |
| Medium | Yes | Intermediate | Remote | No Services | 53 (Medium) |
| Medium | Yes | Expert | Local | Important | 69 (Medium) |
| Medium | No | No exploits | No exploits | High | 40 (Medium) |
| Low | Yes | Novice | Remote | Medium | 52 (Medium) |
| Low | Yes | Intermediate | Remote | Low | 46 (Medium) |
| Low | Yes | Expert | Local | No Services | 37 (Low) |
| Low | No | No exploits | No exploits | Important | 33 (Low) |
| None | No | No exploits | No exploits | No services | 0 (None) |

FIG. 9D

Risk Score Scenarios

908

| Severity (40%) | Exploit Exists (10%) | Exploit Skill Level (10%) | Exploit Attack Vector (10%) | CI Importance (20%) | CI Exposure (10%) | Risk Score |
|---|---|---|---|---|---|---|
| Critical | Yes | Novice | Remote | Important | Internet-facing | 100 (Critical) |
| Critical | Yes | Intermediate | Remote | High | Internal | 87 (High) |
| Critical | Yes | Expert | Local | Medium | Internet-facing | 78 (High) |
| Critical | No | No exploits | No exploits | Low | Internal | 50 (Medium) |
| High | Yes | Novice | Remote | No Services | Internet-facing | 70 (High) |
| High | Yes | Intermediate | Remote | Important | Internal | 82 (High) |
| High | Yes | Expert | Local | High | Internet-facing | 73 (High) |
| High | No | No exploits | No exploits | Medium | Internal | 45 (Medium) |
| Medium | Yes | Novice | Remote | Low | Internet-facing | 65 (Medium) |
| Medium | Yes | Intermediate | Remote | No Services | Internal | 52 (Medium) |
| Medium | Yes | Expert | Local | Important | Internet-facing | 68 (Medium) |
| Medium | No | No exploits | No exploits | High | Internal | 40 (Medium) |
| Low | Yes | Novice | Remote | Medium | Internet-facing | 60 (Medium) |
| Low | Yes | Intermediate | Remote | Low | Internal | 47 (Medium) |
| Low | Yes | Expert | Local | No Services | Internet-facing | 38 (Low) |
| Low | No | No exploits | No exploits | Important | Internal | 35 (Low) |
| None | No | No exploits | No exploits | No services | None | 0 (None) |

FIG. 9E

1000 — RECEIVE, FROM A CLIENT DEVICE ASSOCIATED WITH A MANAGED NETWORK, SELECTED FACTORS FROM A SET OF FACTORS AND RESPECTIVE WEIGHTS FOR EACH OF THE SELECTED FACTORS, WHEREIN PERSISTENT STORAGE CONTAINS: (I) REPRESENTATIONS OF CONFIGURATION ITEMS DISCOVERED IN THE MANAGED NETWORK, THE CONFIGURATION ITEMS INCLUDING COMPUTING DEVICES DEPLOYED WITHIN THE MANAGED NETWORK, (II) REPRESENTATIONS OF VULNERABILITIES DETERMINED TO BE IMPACTING AT LEAST SOME OF THE CONFIGURATION ITEMS, (III) THE SET OF FACTORS, INCLUDING CONFIGURATION ITEM FACTORS THAT CHARACTERIZE THE CONFIGURATION ITEMS AND VULNERABILITY FACTORS THAT CHARACTERIZE THE VULNERABILITIES, EACH OF THE FACTORS PRE-DEFINED TO BE A PRIMARY FACTOR OR A SECONDARY FACTOR, AND (IV) A MAXIMUM NUMBER OF ROWS

1002 — OBTAIN, FROM THE SELECTED FACTORS, COMBINATIONS OF SELECTED PRIMARY FACTORS THAT TOTAL LESS THAN THE MAXIMUM NUMBER OF ROWS

1004 — DETERMINE A DUPLICATION COUNT FOR THE COMBINATIONS OF SELECTED PRIMARY FACTORS, WHEREIN THE DUPLICATION COUNT IS BOUNDED BY A HIGHEST INTEGER MULTIPLE OF THE COMBINATIONS OF SELECTED PRIMARY FACTORS THAT TOTALS LESS THAN THE MAXIMUM NUMBER OF ROWS

1006 — GENERATE, FOR DISPLAY ON A GRAPHICAL USER INTERFACE OF THE CLIENT DEVICE, DATA REPRESENTING A TABLE, WHEREIN EACH COLUMN OF THE TABLE REPRESENTS ONE OF THE SELECTED FACTORS, WHEREIN FOR COLUMNS OF THE TABLE REPRESENTING SELECTED PRIMARY FACTORS, ROWS REPRESENT EACH OF THE COMBINATIONS OF SELECTED PRIMARY FACTORS DUPLICATED ACCORDING TO THE DUPLICATION COUNT, WHEREIN FOR COLUMNS OF THE TABLE REPRESENTING SELECTED SECONDARY FACTORS FROM THE SELECTED FACTORS, ROWS REPRESENT REPEATED ITERATION THROUGH POSSIBLE VALUES OF THE SELECTED SECONDARY FACTORS, AND WHEREIN EACH ROW INCLUDES A RESPECTIVE RISK SCORE BASED ON A WEIGHTED AVERAGE OF THE RESPECTIVE WEIGHTS APPLIED TO THE SELECTED FACTORS REPRESENTED THEREIN

1008 — TRANSMIT, TO THE CLIENT DEVICE, THE DATA REPRESENTING THE TABLE

FIG. 10

DYNAMIC PREVIEW OF SECURITY VULNERABILITY LEVELS IN A MANAGED NETWORK

CROSS-REFERENCE TO RELATED APPLICATION

This application claims priority to U.S. provisional patent application No. 62/855,249, filed May 31, 2019, which is hereby incorporated by reference in its entirety.

BACKGROUND

Computer networks may include tens, hundreds, or thousands of individual computing devices, such as personal computers, laptop computers, servers, virtual machines, storage devices, routers, and so on. These components may be geographically distributed across multiple physical locations. As they may contain or provide access to confidential and/or sensitive information, the security of computer networks can be important to individuals, groups, and organizations.

But with a large and diverse deployment of hardware, operating systems, and software applications, it can be challenging to manage the wide array of threats thereto from acts of hacking, espionage, etc. Thus, vulnerability assessment systems have been developed to automatically or semi-automatically calculate the presence and risk associated with known security vulnerabilities to which the computing devices on a network may be subject. Nonetheless, these vulnerability assessment systems have proven difficult to use in practice due to the vast amount of information they provide.

SUMMARY

In a medium or large managed network, a vulnerability assessment system may identify thousands, hundreds of thousands, or even millions of individual vulnerabilities each time it executes. This vast amount of data can easily overwhelm security managers who are tasked with addressing these vulnerabilities. While most vulnerability assessment systems have some way of indicating the severity of each identified vulnerability, they are currently unable to combine this severity with the importance of the devices exhibiting the vulnerability to provide an overall risk score of the vulnerability on a per-device level.

The embodiments herein involve using such a risk score to classify the risk associated with each vulnerability found on a managed network. This risk score may be a weighted average of a number of factors that characterize the vulnerability (e.g., the vulnerability's severity and/or whether an exploit exists) and the device it is found upon (e.g., the device's importance to the operation of the managed network and/or its exposure to a public network). The factors and the weights may be selected by a security manager.

When more than just one or two factors are used, the number of possible combinations of the values for these factors can grow rapidly into the hundreds or thousands. Thus, it is challenging for the security manager to be able to determine whether the mappings between factors and risk scores is sufficient. For example, the security manager may prefer to have only a few types of vulnerable items fall into the highest range of the risk score. Thus, it is desirable for a risk score to accurately represent the security manager's understanding of the actual risk associated with a vulnerable item.

To mitigate this issue, the embodiments herein may involve displaying a preview that presents a subset of the combinations on a graphical user interface. The subset is designed to be representative of the entire range of risk scores, but only contain a manageable number of possibilities (e.g., 30 or less). In this way, a security manager can quickly determine if the selected factors and weights map to appropriate risk scores. If not, the security manager can dynamically adjust the factors and/or weights until they do. The finalized factors and weights can be deployed to the vulnerability assessment system for production use.

Accordingly, a first example embodiment may involve persistent storage containing: (i) representations of configuration items discovered in a managed network, where the configuration items include computing devices deployed within the managed network, (ii) representations of vulnerabilities determined to be impacting at least some of the configuration items, (iii) a set of factors including configuration item factors that characterize the configuration items and vulnerability factors that characterize the vulnerabilities, where each of the factors is pre-defined to be a primary factor or a secondary factor, and (iv) a maximum number of rows. The first example embodiment may also involve a server device configured to: receive, from a client device associated with the managed network, selected factors from the set of factors and respective weights for each of the selected factors; obtain, from the selected factors, combinations of selected primary factors that total less than the maximum number of rows; determine a duplication count for the combinations of selected primary factors, where the duplication count is bounded by a highest integer multiple of the combinations of selected primary factors that totals less than the maximum number of rows; generate, for display on a graphical user interface of the client device, data representing a table, where each column of the table represents one of the selected factors, where for columns of the table representing selected primary factors, rows represent each of the combinations of selected primary factors duplicated according to the duplication count, where for columns of the table representing selected secondary factors from the selected factors, rows represent repeated iteration through possible values of the selected secondary factors, and where each row includes a respective risk score based on a weighted average of the respective weights applied to the selected factors represented therein; and transmit, to the client device, the data representing the table.

A second example embodiment may involve receiving, from a client device associated with a managed network, selected factors from a set of factors and respective weights for each of the selected factors, where persistent storage contains: (i) representations of configuration items discovered in the managed network, the configuration items including computing devices deployed within the managed network, (ii) representations of vulnerabilities determined to be impacting at least some of the configuration items, (iii) the set of factors, including configuration item factors that characterize the configuration items and vulnerability factors that characterize the vulnerabilities, each of the factors pre-defined to be a primary factor or a secondary factor, and (iv) a maximum number of rows. The second example embodiment may further involve obtaining, from the selected factors, combinations of selected primary factors that total less than the maximum number of rows. The second example embodiment may further involve determining a duplication count for the combinations of selected primary factors, where the duplication count is bounded by a highest integer multiple of the combinations of selected primary factors that totals less than the maximum number of rows. The second example embodiment may further involve generating, for display on a graphical user interface of the client device, data representing a table, where each column of the table represents one of the selected factors, where for columns of the table representing selected primary factors, rows represent each of the combinations of selected primary factors duplicated according to the duplication count, where for columns of the table representing selected secondary factors from the selected factors, rows represent repeated iteration through possible values of the selected secondary factors, and where each row includes a respective risk score based on a weighted average of the respective weights applied to the selected factors represented therein. The second example embodiment may further involve transmitting, to the client device, the data representing the table.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9A depicts risk score scenarios, in accordance with example embodiments.

FIG. 9B depicts further risk score scenarios, in accordance with example embodiments.

FIG. 9C depicts further risk score scenarios, in accordance with example embodiments.

FIG. 9D depicts further risk score scenarios, in accordance with example embodiments.

FIG. 9E depicts further risk score scenarios, in accordance with example embodiments.

FIG. 10 is a flow chart, in accordance with example embodiments.

DETAILED DESCRIPTION

Figure 1:
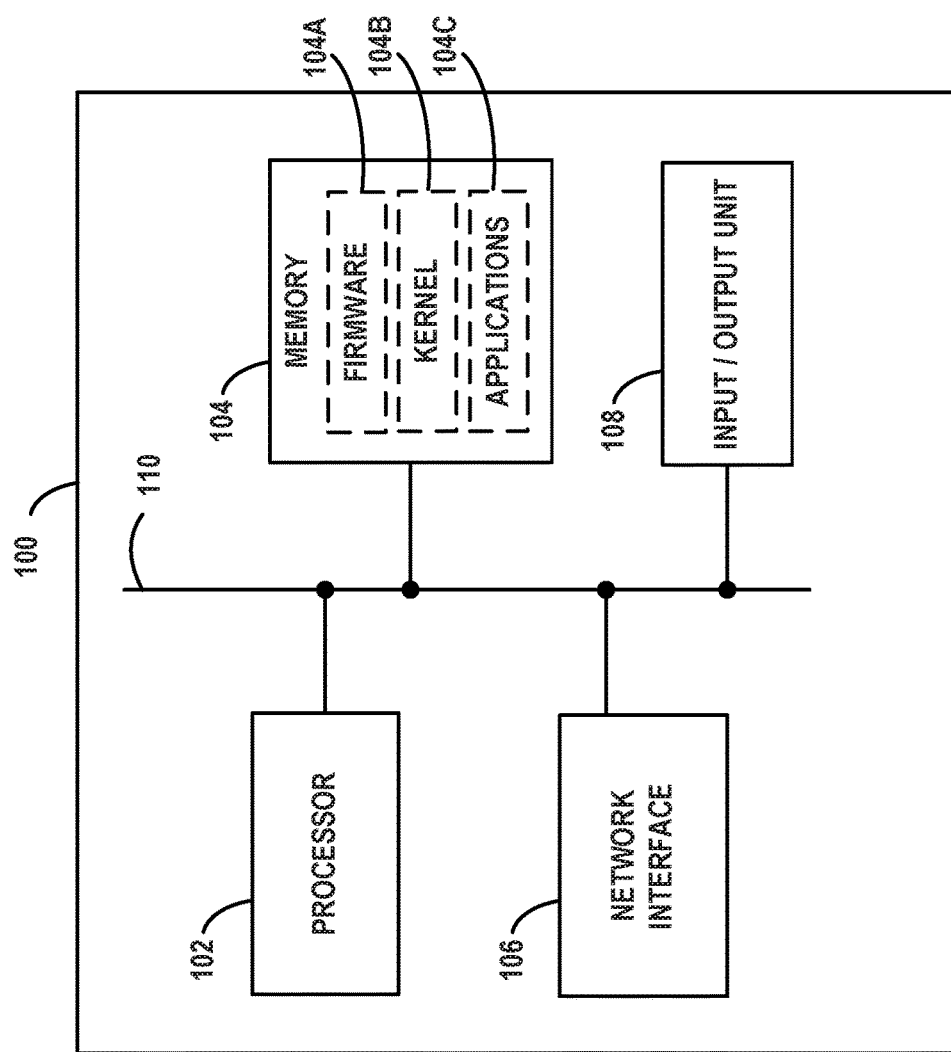
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
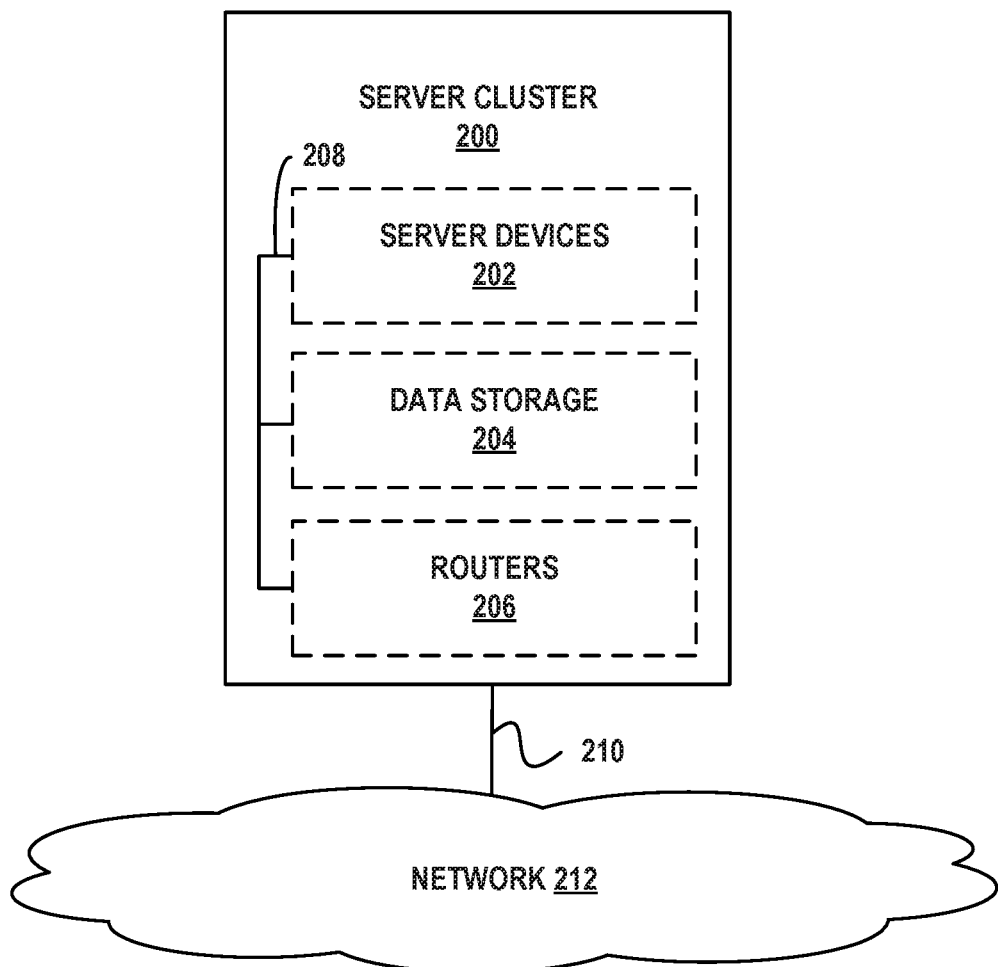
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
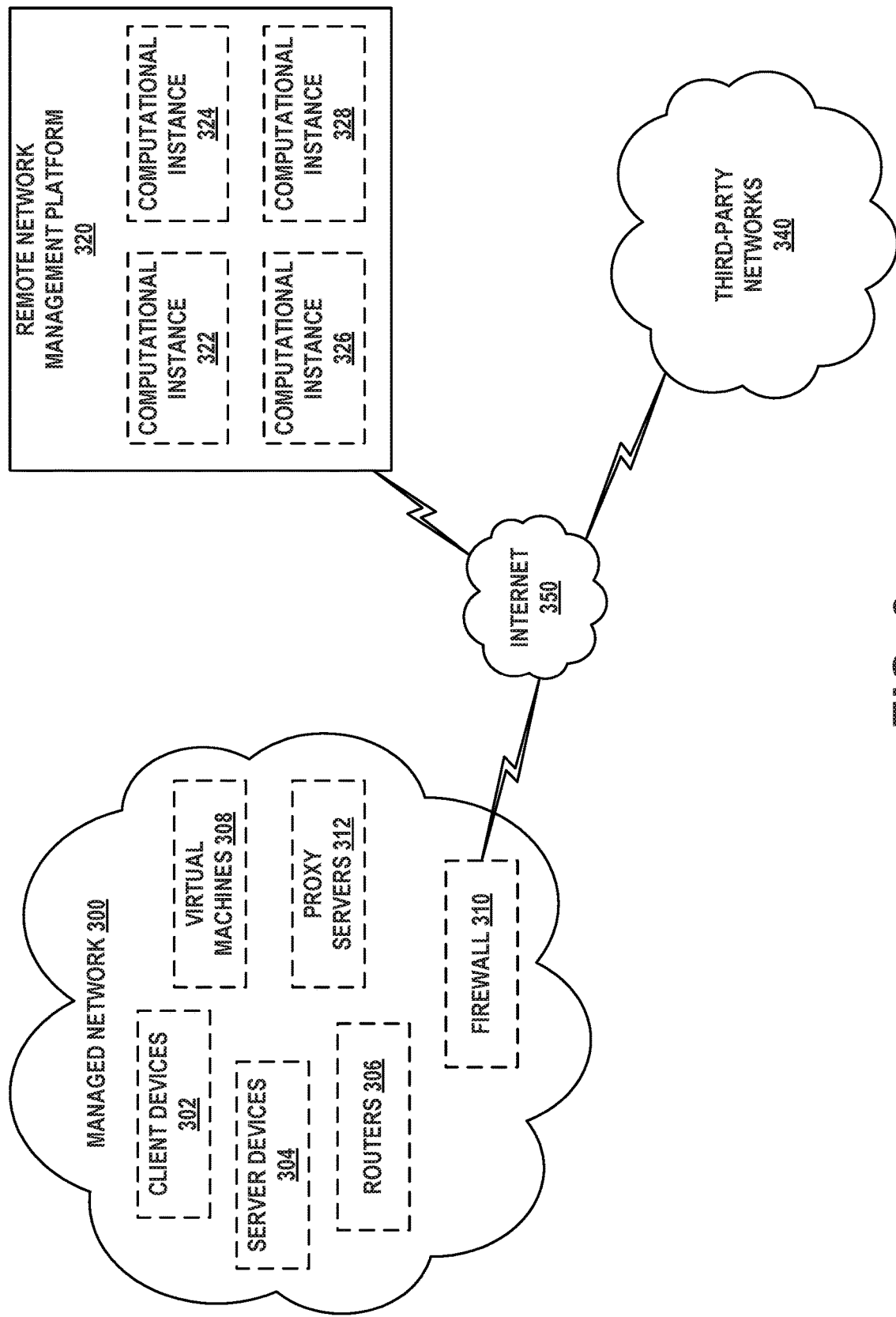
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
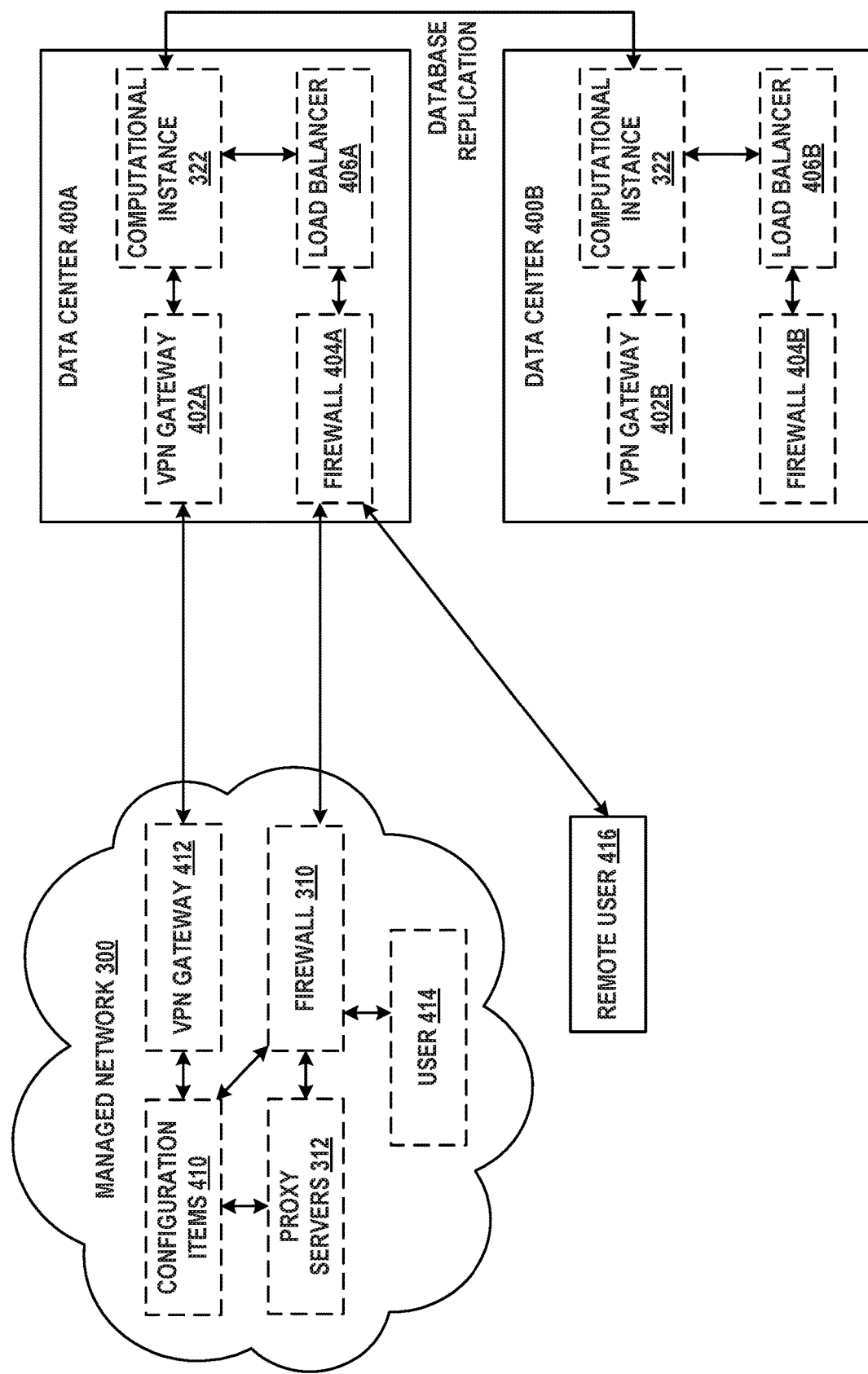
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
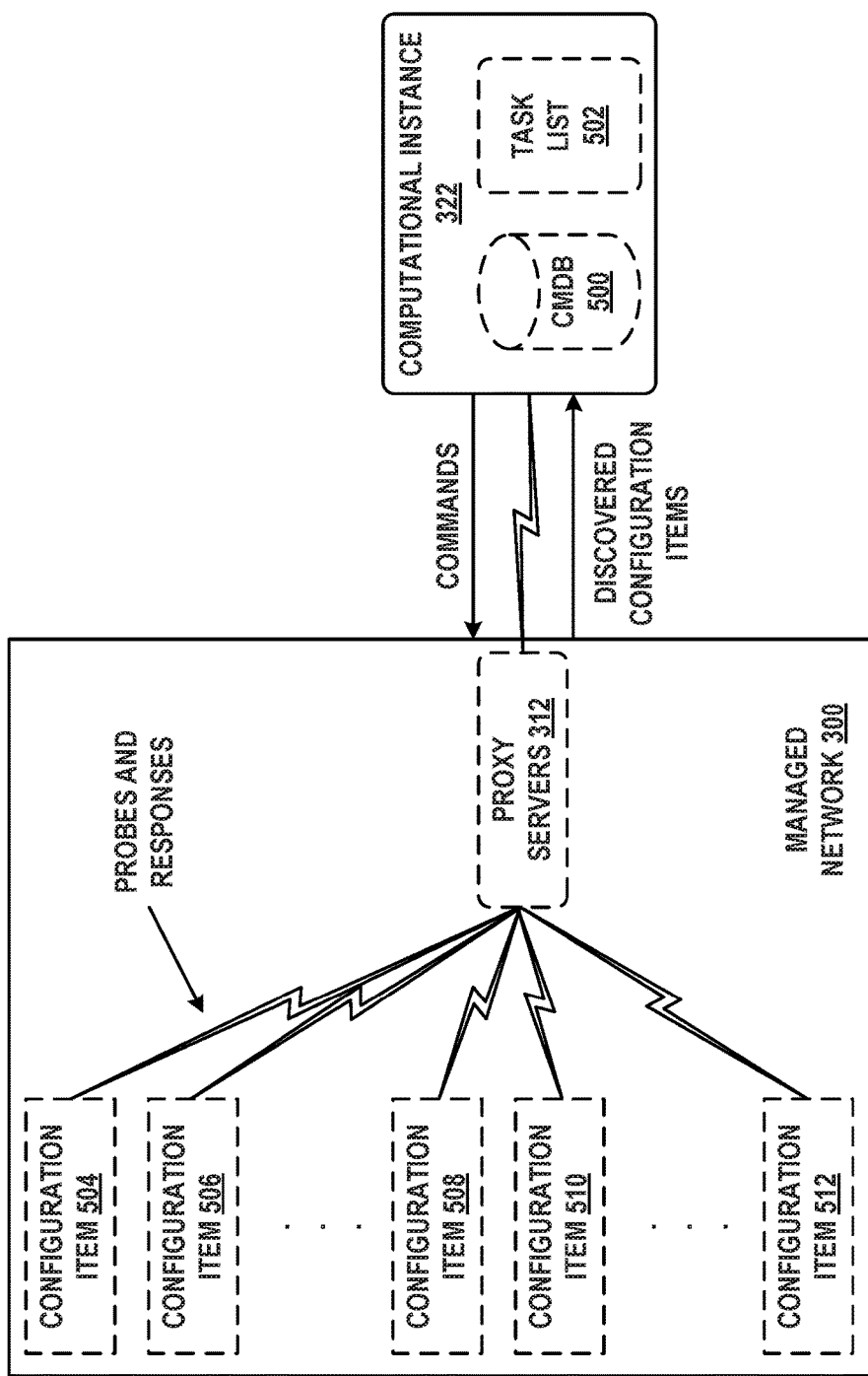
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
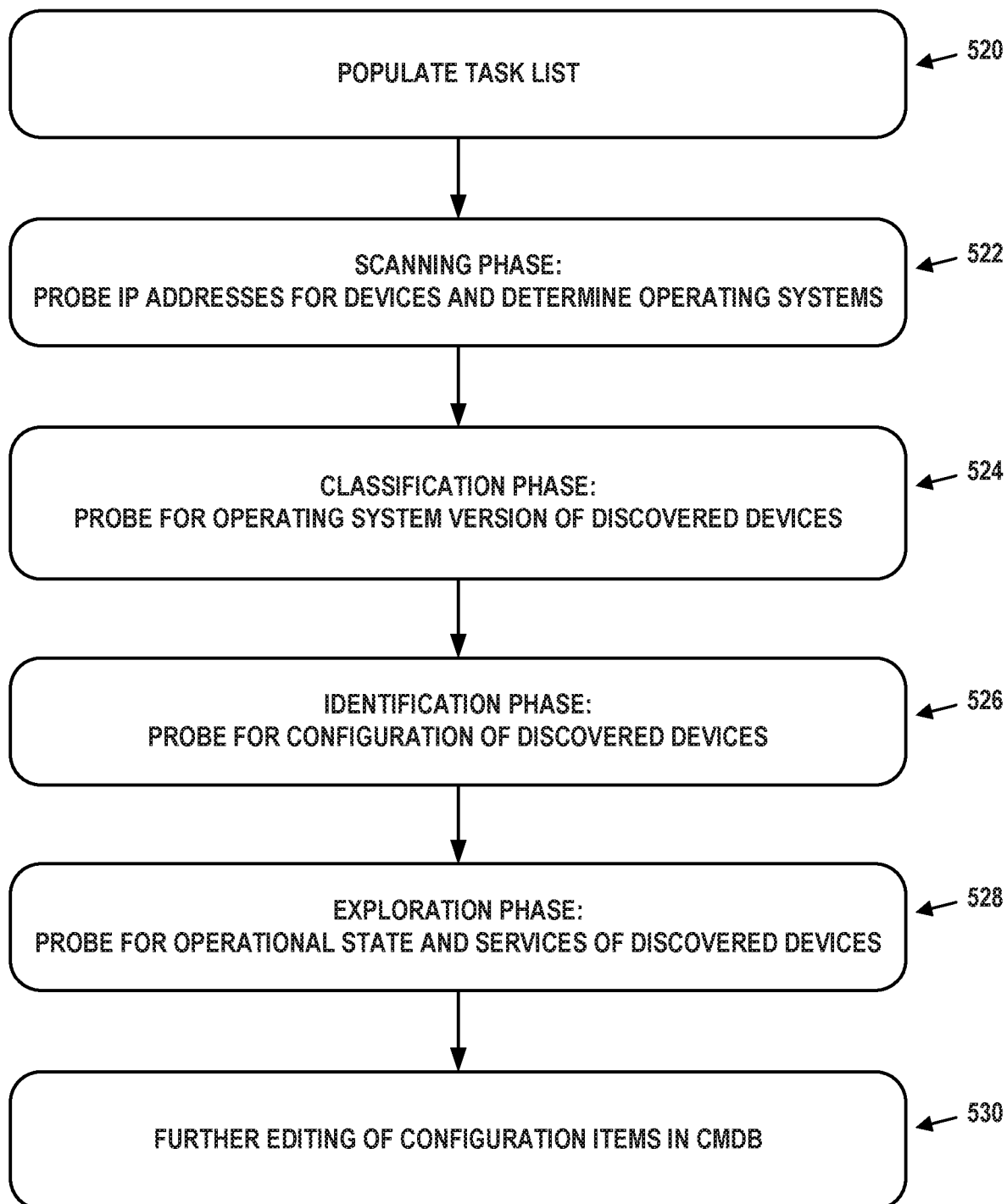
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Vulnerabilities

The vulnerabilities discussed herein may relate to known defects in hardware, operating systems, and/or software packages deployed throughout a managed network. Exploitation of a vulnerability may result in a negative impact to the data confidentiality, integrity and/or availability of one or more computing devices. Such vulnerabilities may be associated with different severities.

For example, a first hypothetical vulnerability may be that opening a certain type of file in a word processing application provides a remotely-exploitable mechanism through which an attacker can gain access to the computing device on which the word processing application is installed. This would likely be viewed a critical vulnerability, as it could lead to unauthorized access to confidential data. On the other hand, a second hypothetical vulnerability may be that providing certain input to a web browsing application may cause the screen of the computing device on which the web browsing application is installed to go blank. This would likely be viewed as a non-critical vulnerability, as it is a mere annoyance to the user. Severity may be chosen, for example, on a spectrum from critical (most severe), to high, to medium, to low (least severe).

Listings of known vulnerabilities are published by governments, as well as various commercial entities. For example, the U.S. National Institute of Standards and Technology (NIST) maintains a public national vulnerability database, listing known vulnerabilities, their severities, and their exploitability (e.g., how an attacker might go about using the vulnerability and how hard this process might be). Exploitability scales may include indications of whether a known exploit exists, how skilled an attacker would have to be to use the exploit, and whether the attacker needs physical access to a target computing device to use the exploit or if the exploit can be used by way of a local or remote network.

Commercial listings may overlap with the government listings and with one another, but can include different vulnerability listings, and use different severity scales and/or exploitability scales. These discrepancies may be due to inherent subjectivity related to classifying vulnerability severity and exploitability, or that these commercial and governmental entities have had different experiences when testing the vulnerability.

It should be noted that vulnerabilities are not the same as active security threats. Vulnerabilities indicate that a problem has been identified independent of whether the vulnerability has been actually exploited. Active security threats, on the other hand, are ongoing exploitations that often require immediate attention. For example, a live distributed denial of service (DDOS) attack should be addressed in real time, regardless of whether any vulnerabilities that it uses are known.

Thus, security managers address vulnerabilities as time allows based on their severities and other factors. Critical severity vulnerabilities may be targeted for resolution within 30 days, for example, while high severity vulnerabilities may be targeted for resolution within 90 days, and so on. Vulnerabilities with lower-level severities may be addressed on an as-time-permits basis or might not be scheduled for resolution at all, as these non-critical vulnerabilities may be deemed low enough risk that security managers should be spending their time carrying out more important tasks instead.

Addressing a vulnerability may occur in various ways. In some cases, the vendor of an operating system or software package with an identified vulnerability may publish an installable patch that resolves the vulnerability. Alternatively, the vendor or another party may identify a workaround to the vulnerability, such as settings that mitigate or prevent the vulnerability from occurring. In some cases, security managers may disable software packages with unpatched vulnerabilities or issue warnings to users until a patch or workaround is available. In extreme situations, vulnerable software may be temporarily or permanently removed from impacted computing devices. Nonetheless, once a resolution is available, security managers may schedule the resolution to be applied in accordance with the severity of the vulnerability.

As the scope of computer networks and the extent of available software packages have grown dramatically, so has the number of vulnerabilities. For instance, the NIST database identified 1537 new vulnerabilities in April 2019 alone. This is in addition to other vulnerabilities that may have been identified in the past. As a result, there are over 117,000 known vulnerabilities in the NIST database. Identifying these vulnerabilities and their associated severities is not possible to do by hand even for a small managed network with just a few devices.

VI. Example Vulnerability Management Architecture

In order to be addressed, vulnerabilities are first detected on a managed network. Given the intractability of doing so manually, a number of software tools are available that perform automated vulnerability detection. Some of these tools include, but are not limited to, NESSUS®, QUALYS-GUARD®, and RAPID7®. For purposes of simplicity, various vulnerability detection and assessment tools are referred to as third-party vulnerability tools in the discussion below.

Figure 6:
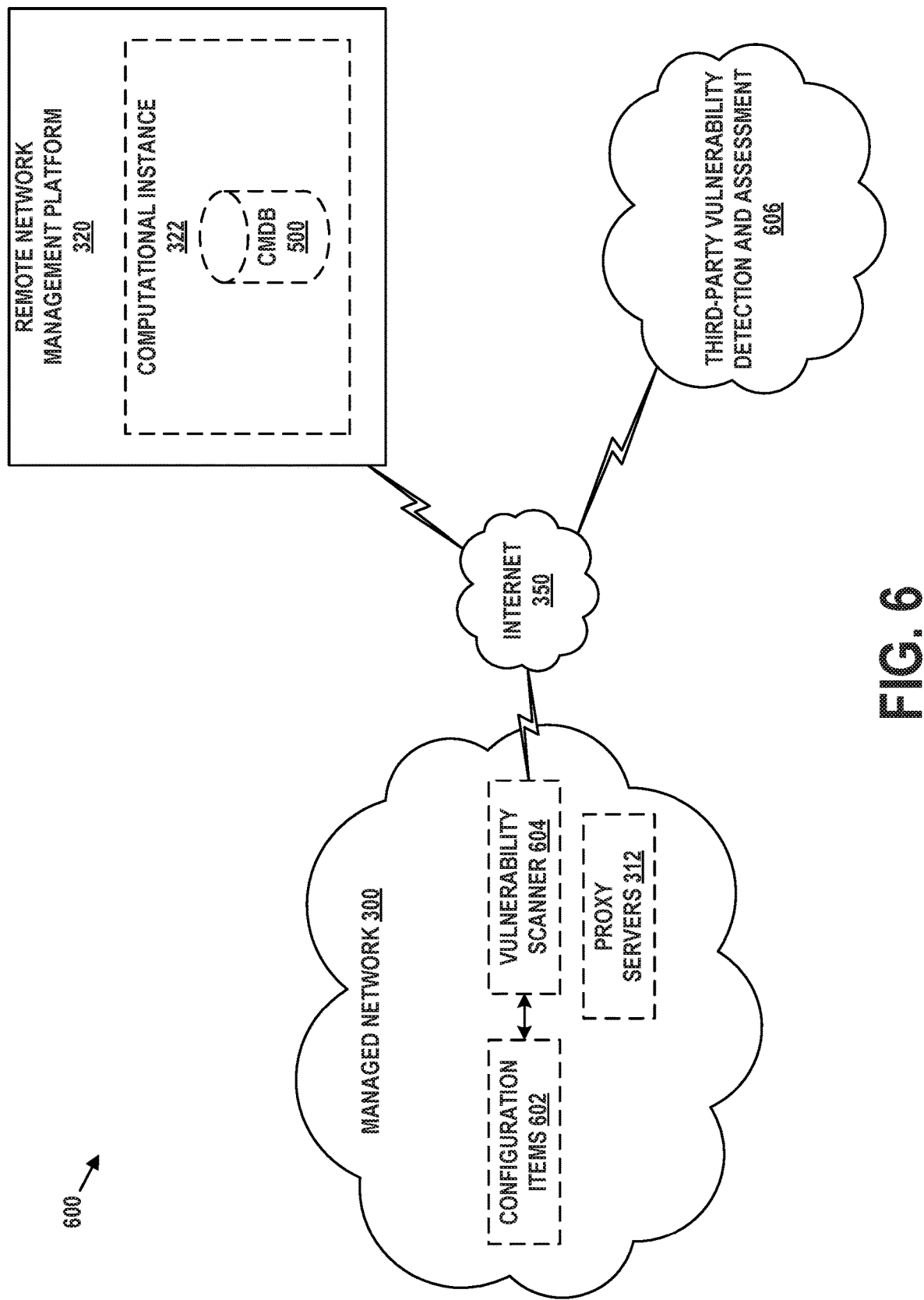
FIG. 6 depicts a communication environment involving a remote network management platform, managed network, and third-party vulnerability detection and assessment platform, in accordance with example embodiments.

FIG. 6 depicts a vulnerability management architecture 600. Architecture 600 includes managed network 300, remote network management platform 320, and third-party vulnerability detection and assessment cloud 606 (referred to as cloud 606 for short), all connected by Internet 350.

Managed network 300 is largely the same as shown in FIG. 3, but just showing configuration items 602, vulnerability scanner 604, and proxy server(s) 312. Each of configuration items 602 may represent a virtual or physical computing device and/or a software application installed upon such a computing device. Vulnerability scanner 604 may be a dedicated unit of software and/or a virtual or physical computing device that is deployed within managed network 300 to detect vulnerabilities relating to configuration items 602. Proxy server(s) may take on the same or similar functionality as described above.

In some embodiments, vulnerability scanner 604 may include a software agent that is deployed on multiple endpoints, where each endpoint is represented as one or more of configuration items 602. In these or other embodiments, vulnerability scanner 604 may include one or more software applications deployed on one or more dedicated computing devices. In either situation, vulnerability scanner 604 may scan or otherwise remotely access configuration items 602 to detect vulnerabilities. For example, vulnerability scanner 604 may scan configuration items 602—e.g., probe for open TCP/IP ports on computing devices, and/or log on to computing devices to determine the operating system, software applications installed thereon, and versions thereof. In some embodiments, vulnerability scanner 604 may store the results of these scans locally, or may transmit the results to cloud 606.

Remote network management platform 320 is the same or similar to that of FIG. 3, but showing only one computational instance, computational instance 322, for sake of simplicity. Computational instance 322 includes CMDB 500. As described above, CMDB 500 may include representations of configuration items 602, including multiple attributes for each.

Cloud 606 is an optional component that might not be present when vulnerability scanner 604 stores the results of scans locally. However, when present, cloud 606 receives these results, and cloud 606 may store and assess the results. For instance, cloud 606 may identify vulnerabilities based on the operating system and version thereof, operating system configuration, software application and version thereof, software configuration, and possible other metrics as well. The identified vulnerabilities may be stored and then made available by way of an interface, such as a web-based graphical user interface, a JavaScript Object Notation (JSON) interface, an XML interface, or some other form of interface.

In particular, computational instance 322 may be configured to obtain the identified vulnerabilities from cloud 606, or from vulnerability scanner 606 by way of proxy server(s) 312. As discussed in more detail below, computational instance 322 may combine this information with additional information from CMDB 500 to provide an overall risk score per vulnerability. These risk scores may be used to prioritize how security managers of managed network 300 address vulnerabilities.

Figure 7:
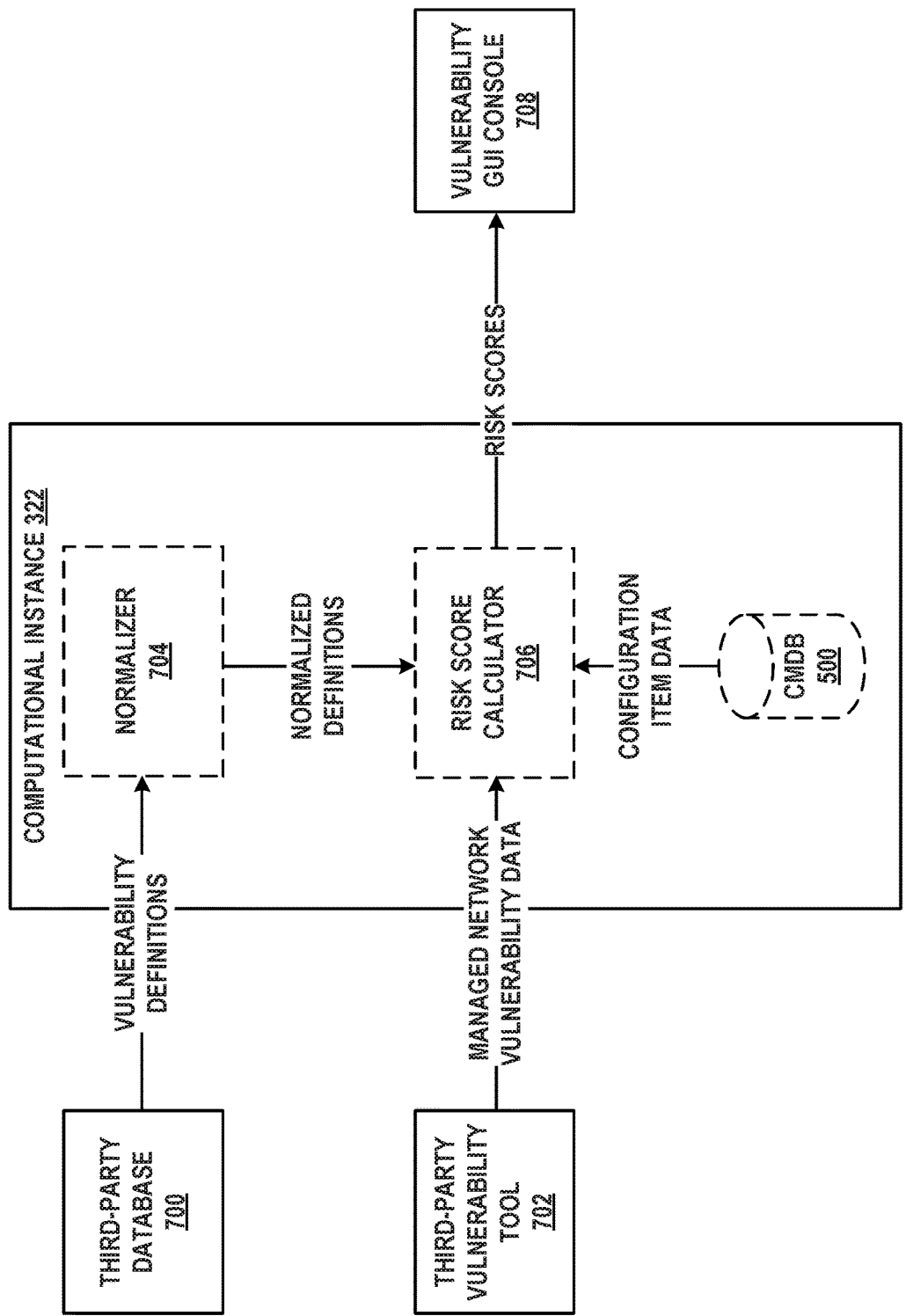
FIG. 7 depicts a vulnerability data flow, in accordance with example embodiments.

FIG. 7 provides further aspects of these procedures. Third-party database 700 contains definitions of vulnerabilities, which may include a severity and/or an exploitability ranking for each known vulnerability. Third-party database 700 may be a governmental or commercial database.

Normalizer 704 of computational instance 322 may obtain the vulnerability definitions from third-party database 700. Normalizer 704 may then map these definitions to normalized definitions used by computational instance 322. This normalization may be desirable if at least some third-party vulnerability databases use different scales to evaluate the severity and/or exploitability of vulnerabilities. For example, computational instance 322 may use a vulnerability severity scale (from most severe to least severe) of critical, high, medium, low, and none, while third-party database may use a vulnerability severity scale (from most severe to least severe) of important, moderate, and optional. Normalizer 704 may be configured to convert the vulnerability definitions from third-party database 700 to the normalized definitions by, for instance, mapping important severities to critical severities, moderate severities to medium severities, and optional severities to low severities. Other severity mappings may be possible and similar mappings may exist for the exploitability scales. Thus, normalizer 704 may be configured to normalize definitions from multiple third-party sources.

Once the vulnerability definitions are normalized, they are provided to risk score calculator 706. Risk score calculator 706 also obtains vulnerability data regarding a managed network (e.g., managed network 300) from third-party vulnerability tool 702. As noted above, computational instance 322 may retrieve this data from a managed network or from cloud 606. This vulnerability data may include, for each vulnerability identified in the managed network, a severity rating and/or an exploitability rating for the vulnerability, as well as references to the configuration items impacted by the vulnerability. Risk score calculator 706 may use the normalized definitions to map the severity and/or exploitability ratings from the vulnerability data to their normalized values.

Risk score calculator may 706 may also obtain information from CMDB 500 regarding the importance of configuration items impacted by the vulnerability. For example, a web server device may be designated with high importance, while a client device used in a lab environment may be designated with low importance. The higher the importance of a configuration item impacted by a vulnerability, the more precedence should be given to addressing this vulnerability.

Risk score calculator may 706 may also obtain information from CMDB 500 regarding the exposure of the configuration items impacted by the vulnerability. For example, an Internet-facing device has more exposure to vulnerabilities than a device internal to a managed network. Thus, Internet-facing devices impacted with a vulnerability should be addressed with higher priority than internal devices with the same vulnerability.

From this input, risk score calculator 706 provides risk scores for each combination of vulnerability and configuration item. The combination of a vulnerability found on a configuration item and that configuration item may be referred to a vulnerable item. Thus, a risk score per vulnerable item is produced. For instance, if a computing device is subject to two vulnerabilities or multiple computing devices are subject to the same vulnerability, one risk score per each of these vulnerable items is provided.

The risk score may be calculated in various ways from the vulnerability severity, vulnerability exploitability, configuration item (CI) importance, and CI exposure information obtained by risk score calculator 706. For instance, each discrete value for vulnerability severity, vulnerability exploitability, CI importance, and CI exposure may map to a number, and the risk score may be calculated as a weighted sum of these numbers. Further, the risk score may be calculated so that it is within a given range (e.g., 0-100, where 0 indicates no risk and 100 indicates the highest level of risk). These risk scores may be displayed in vulnerability graphical user interface console 708 and used by security managers to prioritize the vulnerabilities that they address.

This represents an advance over previous ways of calculating risk scores for vulnerabilities that only considered vulnerability severity, and involved a basic mapping from vulnerability severity to risk score (e.g., the greater the severity the higher the risk). The embodiments herein provide ways to produce risk scores that are more realistic and representative of the actual threats presented by vulnerabilities found on particular devices.

Figure 8:
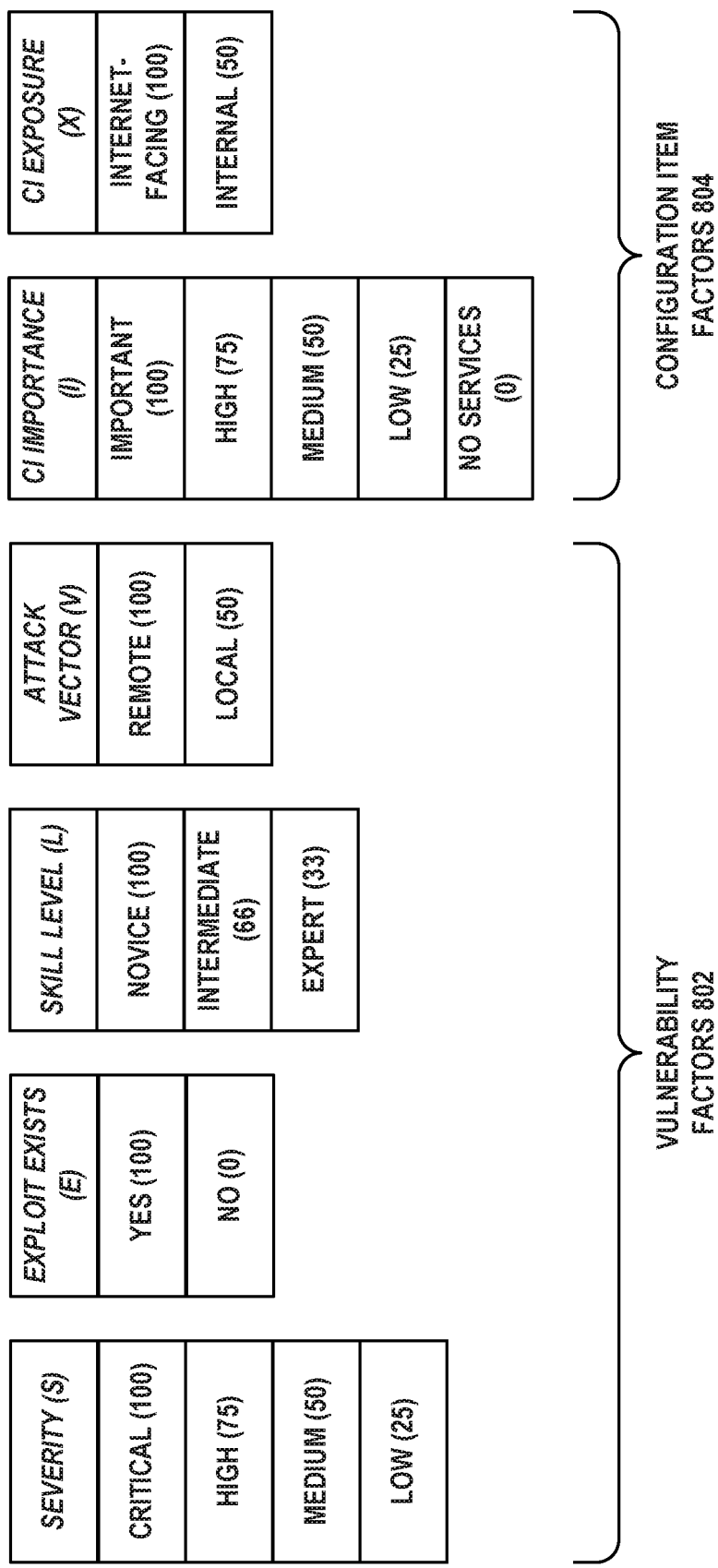
FIG. 8 depicts a set of vulnerability factors and configuration item factors, in accordance with example embodiments.

As an illustration of how a risk score is calculated, FIG. 8 provides a number of factors 800 used in risk score calculation. These include factors that are characteristics of the vulnerability (labelled as vulnerability factors 802) and factors that are characteristics of the configuration item (labelled configuration item factors 804).

The vulnerability factors 802 include the aforementioned severity, whether an exploit exists, and if it does the skill level needed to take advantage of the exploit as well as the attack vector of the exploit. Consistent with the discussion above, severity has four possible values (critical, high, medium, and low), exploit exists has two possible values (yes and no), skill level has three possible values (novice, intermediate, and expert), and attack vector has two possible values (remote and local). The configuration item factors 804 include CI importance and CI exposure. CI importance has five possible values (important, high, medium, low, and no services), and exposure exists has two possible values (Internet-facing and internal).

Each possible value of factors 800 is associated with a number between 0 and 100, inclusive. These numbers are used to calculate the risk score, with higher value indicating a bigger contribution to the overall risk. Thus, a severity of critical, which has a value of 100, is considered to be twice as severe as a severity of medium, which has a value of 50. Values may be assigned to levels in various ways and the assignments in FIG. 8 are for purposes of illustration.

There may be dependencies between some of factors 800. In FIG. 8, the skill level and attack vector factors are dependent on the exploit exists factor, because if an exploit is not known to exist, then there will be no skill level or attack vector associated with it. Thus, the skill level and attack vector factors are only relevant when exploit exists is yes.

Each factor 800 is also associated with a letter—S for severity, E for exploit exists, L for skill level, V for attack vector, I for CI importance, and X for CI exposure. These letters are used to represent the values of each of factors 800 in the risk score calculation. User-defined weights are associated with each factor as well, to provide an overall risk score (RS) equation of:

$$RS = w_S S + w_E E + w_L L + w_V V + w_I I + w_X X$$

where the sum of all weights $(w_S + w_E + w_L + w_V + w_I + w_X)$ is 1.0. In some embodiments, non-integer risk scores may be rounded to the nearest integer or rounded up.

As an example, suppose that the weights are set as follows: $w_S = 0.5$, $w_E = 0.1$, $w_L = 0.05$, $w_V = 0.05$, $w_I = 0.15$, and $w_X = 0.15$. Then, for a vulnerable item with a severity of high, for which an exploit exists, with a skill level of novice, an attack vector that is local, an CI importance of low, and an CI exposure of Internet-facing, the risk score is calculated as:

$$RS = (0.5)(75) + (0.1)(100) + (0.05)(100) + (0.05)(50) + (0.15)(33) + (0.15)(100) = 74.95$$

In another example, a vulnerable item with a severity of low, for which an exploit does not exist, a CI importance of high, and a CI exposure of internal, the risk score is calculated as:

$$RS = (0.5)(25) + (0.1)(0) + (0.15)(100) + (0.15)(50) = 35$$

This latter calculation omits the skill level and attack vector factors because an exploit does not exist. Regardless, the first vulnerable item should be given a higher priority than the second vulnerable item because it has a higher risk score.

In addition to the factors described above, numerous other factors may be used. As just one example, an impact factor may measure a vulnerability's impact on data confidentiality, data integrity, and service availability.

VII. Example Limited Preview User Interfaces for Vulnerabilities

Proper classification of vulnerable items into risk scores is desirable in terms of both achieving network and device security as well as to save time and effort. Different managed networks may allot different degrees of importance to various factors. Thus, the embodiments herein allow users (e.g., security managers) to adjust the weights assigned to factors dynamically so that risk scores reflect these degrees of importance. But it can be difficult for a user to visualize how risk scores are going to be calculated just by assigning weights to factors. Therefore, the embodiments herein provide a unique preview mode (e.g., on a graphical user interface) in which the user is presented with a listing of possible risk score scenarios given selected factors and their assigned weights. Once the user is satisfied that this preview represents a reasonable representation of risks, the user may deploy these settings so that vulnerabilities are classified therewith.

There is a challenge, however, to such a preview mode because the number of combinations of over all factors can easily reach the hundreds or thousands of possibilities. For example, just the factors shown in FIG. 8 result in 280 possibilities (4 severity levels, 7 total exploit/skill level/attack vector levels, 5 importance levels, and 2 exposure levels). Additional factors would multiply the number of possibilities. Displaying all 280 possibilities to the user would be overwhelming and ultimately more confusing than helpful. Instead, it is desirable to display a limited number of possibilities that reasonably represents how the risk score is calculated from the factors. Based on this limited display, the user may accept the current weights, or adjust them until they produce suitable risk scores. Advantageously, this limited preview also adapts to the restricted display size of many modern devices (e.g., mobile phones and/or tablet devices).

To provide a limited preview, factors are divided into primary and secondary categories. For purposes of this discussion, primary factors are the vulnerability factors and secondary factors are the configuration item factors. However, other arrangements are possible.

Additionally, a maximum number of combinations to preview may be configured. This number may be based on how many combinations that a person can be expected to be able to consider without becoming overwhelmed, as well as how much of the display screen is to be dedicated for displaying the possibilities. In some embodiments, there may be between 10 and 40 possibilities displayed, one line per possibility.

FIGS. 9A-9E depicts examples graphical user interfaces that can display risk score scenarios provided by risk score calculation software. From these risk score scenarios, a security manager may be able to quickly determine if the selected factors and weights map to appropriate risk scores. If not, the security manager can dynamically adjust, by way of the graphical user interface, the factors and/or weights until they do. The finalized factors and weights can be deployed for production use.

As noted, these risk score scenarios may involve displaying a preview that presents a subset of the combinations of the factors. The subset is designed to be representative of the entire range of risk scores, but only contain a manageable number of possibilities. Particularly, the example embodiments of FIGS. 9A-9E involve representing the risk scores in 25 or fewer rows.

In FIG. 9A, the security manager has selected severity and exploit exists as factors, and has assigned weights of 80% and 20%, respectively, to these factors. Graphical user interface 900 shows a table containing 8 rows with combinations of these factors and a $9^{th}$ row containing null values. The row with null values is optional, but when present it help provide a full range of values for the risk score (e.g., from 100 down to 0). In this case, only primary factors are present.

The risk score calculation software determines whether all combinations of the primary factors fit within the pre-defined maximum number of rows (i.e., 25 in these examples). Since there are 4 possible values of severity and 2 possible values of exploit exists, there are 8 combinations. This easily fits within the maximum number of rows, so all combinations are displayed. In situations where there are no primary factors selected, one of the secondary factors is used as a primary factor.

For each combination, a risk score is calculated in accordance with the numeric values shown in FIG. 8 and the weights. Thus, in the first row of the table, a severity of critical has a value of 100. When its weight of 80% is applied, this becomes 80. Similarly, an exploit exists of yes has a value of 100. When its weight of 20% is applied, this becomes 20. Summing these two outcomes, the risk score is 100, the highest possible value. On the other hand, if the severity is high and exploit exists is no, the risk score is 60, indicating a much lower risk because there is a lower severity and no known exploit.

Risk scores are mapped to the descriptors critical, high, medium, low, and none. In FIGS. 9A-9E, a risk score of 90 to 100 is deemed critical, 70 up to 90 is deemed high, 40 up to 70 is deemed medium, between 0 and 40 is deemed low, and 0 is deemed none. These mappings may also be user configurable.

In FIG. 9B, the security manager has selected severity, exploit exists, and CI exposure as factors, and has assigned weights of 70%, 10%, and 20%, respectively, to these factors. Graphical user interface 902 shows a table containing 16 rows with combinations of these factors and a $17^{th}$ row containing null values.

The risk score calculation software first determines whether all combinations of the primary factors fit within the pre-defined maximum number of rows (again, 25 in these examples). Since there are 4 possible values of severity and 2 possible values of exploit exists, there are 8 combinations of primary factors. This easily fits within the maximum number of rows, so all combinations are displayed.

Since a secondary factor is present, the risk score calculation software then determines whether a duplication count can be used to multiply the number of times each combination appears in the table. This duplication count is bounded by the maximum number of rows, and the possible values of the selected secondary factors. In this case, the duplication count can be no higher than 2, because there are only two possible values for CI exposure. Thus, the table in graphical user interface 902 displays two rows per combination of primary factors, and iterates between the 2 possible values of CI exposure from the top to bottom row.

For the table of FIG. 9B and all other tables, the value of CI exposure in the top row may be selected to have the largest contribution to risk score. Thus, Internet-facing is selected in the top row, as it contributes 100 toward the risk score (20 after the weight is applied), whereas internal would only contribute 50 toward the risk score (10 after the weight is applied).

So far, the number of combinations of factors displayed has not been limited by the maximum number of rows. This is not the case for FIG. 9C. In this figure, the security manager has selected severity, CI importance, and CI exposure as factors, and has assigned weights of 80%, 10%, and 10%, respectively, to these factors. Graphical user interface 904 shows a table containing 20 rows with combinations of these factors and a $21^{st}$ row containing null values.

The risk score calculation software first determines whether all combinations of the primary factors fit within the pre-defined maximum number of rows (once again, 25 in these examples). Since there are 4 possible values of severity and severity is the only primary factor, there are 4 combinations. This easily fits within the maximum number of rows, so all combinations are displayed.

Since secondary factors are present, the risk score calculation software then determines whether a duplication count can be used to multiply the number of times each combination appears in the table. In this case, there are 10 combinations of CI importance and CI exposure. Enumerating all 10 of these combinations for each severity would require 40 rows, which is far more than the limit of 25. Thus, the highest possible duplication count, 5, is calculated, and each severity is duplicated 5 times in the table. Then, the risk score calculation software iterates independently through the 5 possible values of CI importance and the 2 possible values of CI exposure from the top to bottom row. In this fashion, a representation of the full range of risk scores is provided even though the total number of rows is limited.

FIG. 9D provides an example of how the combinations of primary factors can be limited by the maximum number of rows. In this figure, the security manager has selected severity, exploit exists, exploit skill level, exploit attack vector, and CI importance as factors, and has assigned weights of 50%, 20%, 5%, 5%, and 20%, respectively, to these factors. Graphical user interface 906 shows a table containing 20 rows with combinations of these factors and a $21^{st}$ row containing null values.

The risk score calculation software first determines whether all combinations of the primary factors fit within the pre-defined maximum number of rows (once again, 25 in these examples). Since the exploit skill level and exploit attack vector factors depend on the exploit exists factor, these three factors are considered together. As a group, these factors have 7 possible combinations. When considered with the 4 possible combinations for severity, there are 28 total combinations, too many to fit into the maximum number of rows for the table.

Thus, the risk score calculation software selects combinations of primary factors that fit into the size of the table. In this case, four combinations of the exploit exists, exploit skill level, and exploit attack vector factors group are used. These four combinations may be pre-defined, or determined dynamically. The selected combinations include three in which exploit exists is yes and one in which exploit exists is no. For the three in which exploit exists is yes all possible values of exploit skill level are represented, while the two values of exploit attack vector are presented in a pattern that favors remote over local. Other combinations are possible.

In particular, combinations of exploit skill level and exploit attack vector may be selected for representation based on the likelihood that these combinations go together and make sense. For example, it is likely that an exploit skill level that is novice or intermediate will be remotely accessible. Conversely, it is also likely that an exploit skill level that is expert will require local access. Thus, the combinations of exploit skill level and exploit attack vector are displayed as shown in FIG. 9D. But other possible combinations may be used instead.

Since secondary factors are present, the risk score calculation software then determines whether a duplication count can be used to multiply the number of times each combination appears in the table. In this case, there are already 16 rows in the table just from the combinations of primary factors, so the only valid duplication count is 1. Accordingly, the risk score calculation software iterates through the 5 possible values of CI importance from the top to bottom row. Similar to the table of FIG. 9C, a representation of the full range of risk scores is provided even though the total number of rows is limited.

In FIG. 9E, graphical user interface 908 depicts a similar risk score scenario as FIG. 9D, except that the weights are different and the CI exposure factor is included. The primary factors are arranged in the same combination as the table of FIG. 9D. Similar to FIG. 9C, the risk score calculation software iterates independently through the 5 possible values of CI importance and the 2 possible values of CI exposure from the top to bottom row. Again, a representation of the full range of risk scores is provided even though the total number of rows is limited.

VIII. Example Operations

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 involves receiving, from a client device associated with a managed network, selected factors from a set of factors and respective weights for each of the selected factors. Persistent storage (e.g., one or more databases) may contain: (i) representations of configuration items discovered in the managed network, the configuration items including computing devices deployed within the managed network, (ii) representations of vulnerabilities determined to be impacting at least some of the configuration items, (iii) the set of factors, including configuration item factors that characterize the configuration items and vulnerability factors that characterize the vulnerabilities, each of the factors pre-defined to be a primary factor or a secondary factor, and (iv) a maximum number of rows.

Block 1002 involves obtaining, from the selected factors, combinations of selected primary factors that total less than the maximum number of rows.

Block 1004 involves determining a duplication count for the combinations of selected primary factors, where the duplication count is bounded by a highest integer multiple of the combinations of selected primary factors that totals less than the maximum number of rows.

Block 1006 involves generating, for display on a graphical user interface of the client device, data representing a table, where each column of the table represents one of the selected factors. For columns of the table representing selected primary factors, rows represent each of the combinations of selected primary factors duplicated according to the duplication count. For columns of the table representing selected secondary factors from the selected factors, rows represent repeated iteration through possible values of the selected secondary factors. Further, each row includes a respective risk score based on a weighted average of the respective weights applied to the selected factors represented therein.

Block 1008 involves transmitting, to the client device, the data representing the table.

In some embodiments, the configuration items include software applications installed on the computing devices.

In some embodiments, the primary factors are the vulnerability factors and the secondary factors are the configuration item factors.

In some embodiments, the vulnerability factors include a vulnerability severity factor that respectively characterizes severities of the vulnerabilities, an exploit exists factor that respectively indicates whether exploits are known for the vulnerabilities, an exploit skill level factor that respectively characterizes skill levels expected to be required in order to exploit the vulnerabilities, and an exploit attack vector factor that respectively characterizes degrees of access expected to be required in order to exploit the vulnerabilities.

In some embodiments, the configuration item factors include a configuration item importance factor that respectively characterizes importance of the configuration items to the managed network, and a configuration item exposure factor that respectively characterizes whether the configuration items are directly reachable from a public network.

Some embodiments may involve: (i) receiving, from the client device, updated respective weights for each of the selected factors; (ii) generating, for display on the graphical user interface of the client device, updated data representing the table, where each row includes an updated risk score based on an updated weighted average of the updated respective weights applied to the selected factors represented therein; and (iii) transmitting, to the client device, the updated data representing the table.

In some embodiments, obtaining combinations of the selected primary factors involves obtaining all possible combinations of the selected primary factors. Alternatively, obtaining combinations of the selected primary factors involves obtaining a pre-defined subset of combinations of the selected primary factors.

In some embodiments, the maximum number of rows is between 10 and 30 inclusive. In some cases, the maximum number of rows is 17 or 25.

In some embodiments, generating the data representing the table further involves adding a bottom row to the table, where the selected factors in the bottom row are assigned values such that a risk score in the bottom row has a lowest possible value.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
persistent storage containing: (i) representations of configuration items discovered in a managed network, wherein the configuration items include computing devices deployed within the managed network, (ii) representations of vulnerabilities determined to be impacting at least some of the configuration items, (iii) a set of factors including configuration item factors that characterize the configuration items and vulnerability factors that characterize the vulnerabilities, wherein each of the factors is pre-defined to be a primary factor or a secondary factor, and (iv) a maximum number of rows; and
a server device configured to:
receive, from a client device associated with the managed network, selected factors from the set of factors and respective weights for each of the selected factors;
obtain, from the selected factors, combinations of selected primary factors that total less than the maximum number of rows;
determine a duplication count for the combinations of selected primary factors, wherein the duplication count is bounded by a highest integer multiple of the combinations of selected primary factors that totals less than the maximum number of rows;
generate, for display on a graphical user interface of the client device, data representing a table, wherein each column of the table represents one of the selected factors, wherein for columns of the table representing selected primary factors, rows represent each of the combinations of selected primary factors duplicated according to the duplication count, wherein for columns of the table representing selected secondary factors from the selected factors, rows represent repeated iteration through possible values of the selected secondary factors, and wherein each row includes a respective risk score based on a weighted average of the respective weights applied to the selected factors represented therein; and transmit, to the client device, the data representing the table.

2. The system of claim 1, wherein the configuration items include software applications installed on the computing devices.

3. The system of claim 1, wherein the primary factors are the vulnerability factors and the secondary factors are the configuration item factors.

4. The system of claim 1, wherein the vulnerability factors include a vulnerability severity factor that respectively characterizes severities of the vulnerabilities, an exploit exists factor that respectively indicates whether exploits are known for the vulnerabilities, an exploit skill level factor that respectively characterizes skill levels expected to be required in order to exploit the vulnerabilities, and an exploit attack vector factor that respectively characterizes degrees of access expected to be required in order to exploit the vulnerabilities.

5. The system of claim 1, wherein the configuration item factors include a configuration item importance factor that respectively characterizes importance of the configuration items to the managed network, and a configuration item exposure factor that respectively characterizes whether the configuration items are directly reachable from a public network.

6. The system of claim 1, wherein the server device is further configured to:

receive, from the client device, updated respective weights for each of the selected factors;

generate, for display on the graphical user interface of the client device, updated data representing the table, wherein each row includes an updated risk score based on an updated weighted average of the updated respective weights applied to the selected factors represented therein; and transmit, to the client device, the updated data representing the table.

7. The system of claim 1, wherein obtaining combinations of the selected primary factors comprising obtaining all possible combinations of the selected primary factors.

8. The system of claim 1, wherein obtaining combinations of the selected primary factors comprising obtaining a pre-defined subset of combinations of the selected primary factors.

9. The system of claim 1, wherein the maximum number of rows is between 10 and 30 inclusive.

10. The system of claim 9, wherein the maximum number of rows is 17 or 25.

11. The system of claim 1, wherein generating the data representing the table further comprises adding a bottom row to the table, wherein the selected factors in the bottom row are assigned values such that a risk score in the bottom row has a lowest possible value.

12. A computer-implemented method comprising:

receiving, from a client device associated with a managed network, selected factors from a set of factors and respective weights for each of the selected factors, wherein persistent storage contains: (i) representations of configuration items discovered in the managed network, the configuration items including computing devices deployed within the managed network, (ii) representations of vulnerabilities determined to be impacting at least some of the configuration items, (iii) the set of factors, including configuration item factors that characterize the configuration items and vulnerability factors that characterize the vulnerabilities, each of the factors pre-defined to be a primary factor or a secondary factor, and (iv) a maximum number of rows;

obtaining, from the selected factors, combinations of selected primary factors that total less than the maximum number of rows;

determining a duplication count for the combinations of selected primary factors, wherein the duplication count is bounded by a highest integer multiple of the combinations of selected primary factors that totals less than the maximum number of rows;

generating, for display on a graphical user interface of the client device, data representing a table, wherein each column of the table represents one of the selected factors, wherein for columns of the table representing selected primary factors, rows represent each of the combinations of selected primary factors duplicated according to the duplication count, wherein for columns of the table representing selected secondary factors from the selected factors, rows represent repeated iteration through possible values of the selected secondary factors, and wherein each row includes a respective risk score based on a weighted average of the respective weights applied to the selected factors represented therein; and transmitting, to the client device, the data representing the table.

13. The computer-implemented method of claim 12, wherein the primary factors are the vulnerability factors and the secondary factors are the configuration item factors.

14. The computer-implemented method of claim 12, wherein the vulnerability factors include a vulnerability severity factor that respectively characterizes severities of the vulnerabilities, an exploit exists factor that respectively indicates whether exploits are known for the vulnerabilities, an exploit skill level factor that respectively characterizes skill levels expected to be required in order to exploit the vulnerabilities, and an exploit attack vector factor that respectively characterizes degrees of access expected to be required in order to exploit the vulnerabilities.

15. The computer-implemented method of claim 12, wherein the configuration item factors include a configuration item importance factor that respectively characterizes importance of the configuration items to the managed network, and a configuration item exposure factor that respectively characterizes whether the configuration items are directly reachable from a public network.

16. The computer-implemented method of claim 12, further comprising:

receiving, from the client device, updated respective weights for each of the selected factors;

generating, for display on the graphical user interface of the client device, updated data representing the table, wherein each row includes an updated risk score based on an updated weighted average of the updated respective weights applied to the selected factors represented therein; and transmitting, to the client device, the updated data representing the table.

17. The computer-implemented method of claim 12, wherein obtaining combinations of the selected primary factors comprising obtaining all possible combinations of the selected primary factors.

18. The computer-implemented method of claim 12, wherein obtaining combinations of the selected primary factors comprising obtaining a pre-defined subset of combinations of the selected primary factors.

19. The computer-implemented method of claim 12, wherein generating the data representing the table further comprises adding a bottom row to the table, wherein the selected factors in the bottom row are assigned values such that a risk score in the bottom row has a lowest possible value.

20. An article of manufacture including a non-transitory computer-readable medium, having stored thereon program instructions that, upon execution by a computing system, cause the computing system to perform operations comprising:

receiving, from a client device associated with a managed network, selected factors from a set of factors and respective weights for each of the selected factors, wherein persistent storage contains: (i) representations of configuration items discovered in the managed network, the configuration items including computing devices deployed within the managed network, (ii) representations of vulnerabilities determined to be impacting at least some of the configuration items, (iii) the set of factors, including configuration item factors that characterize the configuration items and vulnerability factors that characterize the vulnerabilities, each of the factors pre-defined to be a primary factor or a secondary factor, and (iv) a maximum number of rows;

obtaining, from the selected factors, combinations of selected primary factors that total less than the maximum number of rows;

determining a duplication count for the combinations of selected primary factors, wherein the duplication count is bounded by a highest integer multiple of the combinations of selected primary factors that totals less than the maximum number of rows;

generating, for display on a graphical user interface of the client device, data representing a table, wherein each column of the table represents one of the selected factors, wherein for columns of the table representing selected primary factors, rows represent each of the combinations of selected primary factors duplicated according to the duplication count, wherein for columns of the table representing selected secondary factors from the selected factors, rows represent repeated iteration through possible values of the selected secondary factors, and wherein each row includes a respective risk score based on a weighted average of the respective weights applied to the selected factors represented therein; and transmitting, to the client device, the data representing the table.

\* \* \* \* \*